United States Patent
Sievers et al.

[11] Patent Number: 5,883,314
[45] Date of Patent: Mar. 16, 1999

[54] COATING METHODS, COATING PRODUCTS AND COATED ARTICLES

[76] Inventors: George K. Sievers, c/o TMTRD, 1605 W. Magnolia Blvd., Burbank, Calif. 91506; Eugene V. Clark, c/o TMT, 7327 Elmo St., Tujunga, Calif. 91042

[21] Appl. No.: 661,494

[22] Filed: Jun. 11, 1996

Related U.S. Application Data

[60] Provisional application No. 60/015,251 Apr. 10, 1996.
[51] Int. Cl.$^6$ .............................. C22C 33/02; C22C 33/06
[52] U.S. Cl. ................................. 75/230; 75/246; 428/637
[58] Field of Search ....................... 75/230, 246; 428/637

[56] References Cited

U.S. PATENT DOCUMENTS

| | | | |
|---|---|---|---|
| 3,073,269 | 1/1963 | Hoppin, III et al. | 113/110 |
| 3,155,491 | 11/1964 | Hoppin, III et al. | 75/5 |
| 4,842,953 | 6/1989 | Perkins et al. | 428/553 |
| 4,937,042 | 6/1990 | Perkins et al. | 419/8 |
| 5,549,767 | 8/1996 | Pietruska et al. | 148/512 |

*Primary Examiner*—Daniel J. Jenkins
*Attorney, Agent, or Firm*—Louis J. Bachand

[57] ABSTRACT

Abradable coatings for turbine engine shrouds are formed from biscuits formed of silicon-diffused powdered alloy compositions which are processed with an HF precursor to strip oxides from the coating during processing, the alloy blends comprising $MCrAl(Y)_n$ alloys in which n is 0, 1 or more.

20 Claims, 1 Drawing Sheet

COATING METHODS, COATING PRODUCTS AND COATED ARTICLES

REFERENCE TO RELATED APPLICATIONS

This application claims the benefit of United States Provisional Patent Application, Ser. No. 60/015,251, filed on Apr. 10, 1996.

TECHNICAL FIELD

This invention relates to coating methods, products used in coating methods, and articles coated by such methods and products. In a particular aspect the invention is concerned with methods for the abradable coating of turbine engine shroud segments, products for forming coatings thereon, and coated articles, particularly turbine engine shroud segments with abradable coatings. More specifically, the invention relates to improved methods and products for effecting such coatings, and better coated articles. The invention improved coating products include flexibly formable biscuits for coating turbine engine shroud segments, which are laminar in form to provide different thicknesses of coating material for different applications, from shrouds, to turbine blade leading edges, to blade tips, and to other applications. The biscuits of the invention will conform generally to the curvature of any part. The invention biscuits are readily produced from mixtures of alloy powders of wider compositional variety than previously known biscuits for the purpose, and contain stripping agents or stripping agent precursors effective to strip oxides, such as aluminum oxide, or yttrium oxides from the substrate surface and from the coating composition during formation of the coating and thereby ensure maximum efficiency in bonding development between the substrate and coating.

In another aspect, the invention provides novel brazing compositions and methods for fabrication of the coating biscuit products. In this aspect the invention utilizes diffusion alloy processes, such as cementitious pack diffusions, to controllably add, in optimum distribution, fusion temperature lowering amounts of silicon to MCrAl and MCrAlY alloy powders to be subsequently converted into biscuits and formed into coatings on metal parts. In a further aspect, the invention provides methods of fabricating MCrAl, MCrAlY and other alloy powders into useful forms, suitably laminar and separable into layers of different thicknesses for different depths of coating on a selected metal part by the use of resinous processing aids such as polytetrafluoroethylene.

BACKGROUND OF THE INVENTION

In the aspect of the invention concerned with production of coated turbine engine shrouds. The old technology improved upon by the present invention is set forth in U.S. Pat. Nos. 4,842,953 and 4,937,042, both to Perkins and Smith, referred to herein as the Perkins patents. In these patents the patentees describe the need in gas turbine engines to achieve as great a reduction in leakage as possible between stationary and rotating gas turbine members and the use of abradable seals on turbine engine shroud segments to effect control of leakage. These patents describe the formation of suitable abradable seals on turbine engine shrouds by a biscuit process in which two specific, composition-limited powder alloys are mixed and compacted to a preform exhibiting self-supporting "green strength". The preform is suitably pre-sintered by taking its temperature to a temperature at which the lower, but not the higher melting alloy melts, i.e. above the liquidus temperature of the lower melting alloy but not as high as the liquidus temperature of the higher melting alloy. The resulting preform is a "biscuit" of fixed shape; thus fixed in shape the biscuit must of necessity be closely congruent with the article to be coated, e.g. a shroud surface, since the preform biscuit by the Perkins patent process is brittle and cannot subsequently be flexed to conform to any surface but the intended one. Once securely placed on the shroud surface, the biscuit preform is heated to a temperature at which the lower melting alloy powder liquid phase sinters the powder composition, and, then further heated to temperatures at which the interdiffused powered alloys fuse together and bond to the substrate. The patentees require defined levels of silicon and yttrium in the overall composition, the presence of one and not the other in the respective alloy powders, which with other criteria imposed severely limits the number of alloys useful in the method and the variety of products to be obtained. Alloys containing substantial amounts of aluminum, yttrium, or titanium, or other metals prone to form surface oxides, such as Inco 738 containing about 4% by weight of each of aluminum and titanium, are advantageously coated with the compositions and methods of this invention. By the use of the invention compositions and methods such oxides are stripped from the coating composition and from the surface of the alloy articles being coated, as well, allowing bonding where the presence of these oxides had been thought to preclude it. For yttrium containing alloys such as CO-159, increased amounts of yttrium can be used in coatings in accordance with the invention beyond the 0.1% by weight taught as the maximum in the Perkins patents. This is because, in contradistinction to the Perkins patents, the present invention provides for stripping the oxides generated in the coatings or on the article surface before coating. Oxide presence is inimical to effective bonding of the biscuit to the substrate.

SUMMARY OF THE INVENTION

It is an object of the present invention to provide an improved method of coating turbine engine shrouds. It is another object to provide such a coating method using biscuits which are flexible to be conformed to virtually any shape of substrate surface. It is a further object to provide a method of making biscuits for such coating methods which is not limited in which alloys it can use by narrow constraints on the presence and quantities of silicon and/or yttrium, aluminum or titanium and novel biscuits by such method. Yet another object is to provide biscuit compositions which are self-stripping of oxides, and coatings and coated articles made therefrom which are stripped of oxides in the course of coating formation as a result of the biscuit composition. Still another object is to provide a repair composition, suitably but not necessarily in the form of a biscuit, for repair of metal parts, including gas turbine components such as shrouds, blade surfaces and blade tips, and components of all types, e.g. where an abradable surface coating is desirable. Another object is to provide improvements in the processing of superalloy powders into coating products such as biscuits. Other objects include provision of coating preparation methods which enable the use of a wide number of superalloys, and not just those having ab initio the desired amount of silicon present for fusion, and fabrication methods which simplify biscuit formation, provide flexible biscuits, and as well incorporate oxide-stripping components in situ in the coating composition.

These and other objects of the invention to become apparent hereinafter are realized by provision of a novel biscuit of a widely variable composition, which, when coated onto a shroud or other substrate, forms an effective coating, such as an abradable coating. More particularly, the invention objects are realized by modifying in a cementitious diffusion pack any of numerous alloys to incorporate silicon into the alloys without change in the basic composition. These diffusion-modified alloys are then used to distribute silicon highly uniformly through the biscuit and thus through the coating composition which comprises the diffusion-modified alloy, now a lower melting alloy, and a second, higher melting alloy; their combination forming a braze coating composition in which the lower melting alloy is the low temperature fusing, sintering alloy in the blend with a higher melting suitable alloy.

In another aspect of the invention, these objects are further realized by adding a source of hydrofluoric acid to the alloy blend to act as an oxide stripper upon final melt formation of the abradable coating or repair. The HF source is suitably in the form of a high molecular weight fluorinated polymer which will facilitate biscuit formation and biscuit flexibility before volatilizing as HF and other products in the final steps of the method. The use of the noted polymers further facilitates wetting of the composition powders by the silicon-containing lower melting alloy, enabling easier processing through the use of the polymer processing aid and improved fusion response in the composition. The improved wetting property in the polymer-containing powdered alloy blends of the invention removes a serious limitation on the presence of yttrium in the alloys. Yttrium content, e.g. in the previously mentioned patents, to less than 0.1% by weight, has been limited so as to avoid difficulties in wetting of the powders during fusion. This limiting of yttrium content is both unfortunate and unnecessary as shown by the present method where effective and efficient wetting of the powdered alloy blend is obtained with as much as 0.5% by weight of yttrium, i.e. five times as much, and even higher amounts of yttrium up to 1% by weight and more, in the powdered alloys when there is also present the polytetrafluoroethylene polymer.

The invention, accordingly, includes the method of making an article having an environmentally resistant, abradable surface, including, for particular compositions:

(a) Providing a powder mixture of first and second powdered alloys each having a base of elements M, Cr and Al in which M is at least one of the group of Ni, Co and Fe, the mixture having a total mixture composition of, by weight, 10–35% Cr, 4–19% Al, a small but effective amount of Y, 2–6% Si and the balance M, and further characterized by a substantial absence of B, the first of the powdered alloys having a solidus and a liquidus, constituting from about 30 to about 50% by weight of the mixture, and comprising by weight 1.5–4% Al, 10–30% Cr and the balance M, the first alloy characterized by having silicon diffused thereinto in melting range lowering amount between about 5% and about 18% by weight, the second of the powdered alloys having a solidus and a liquidus, constituting from about 50 to about 70% by weight of the mixture, and having a melting range higher than the first of the powdered alloys, the second alloy characterized by a substantial absence of Si, the first and/or second alloy characterized by the presence of Y in an amount, up to a total of about 1.0% by weight, which will provide the Y content in the total mixture composition;

(b) Compacting the mixture at compacting temperatures below the solidus of the first of the powdered alloys to provide a preform;

(c) Disposing the preform on a surface of the article;

(d) Heating the preform and article surface in a nonoxidizing atmosphere above the liquidus temperature of the first powdered alloy and below the liquidus of the second powdered alloy of the mixture; and (e) Holding the preform and article surface at the processing temperature for a time sufficient to liquid phase sinter the powder mixture, to interdiffuse elements of the first and second powders, and bond the preform to the article surface.

In this method, there is typically further included dispersing an HF precursor in an oxide purging amount in the mixture before heating at processing temperature to generate HF, selecting polytetrafluoroethylene as the HF precursor, combining the first and second powdered alloys with an alloy powder binding amount of polytetrafluoroethylene and compacting to provide the preform, and, heating the first alloy together with silicon in a diffusion pack to diffuse silicon into the alloy powder in advance of adding the silicon diffused first powdered alloy to the mixture.

In another embodiment of the invention there is provided a method of making an article having an environmentally resistant, abradable surface, including:

(a) Providing a powder mixture of first and second powdered alloys each having a base of elements M, Cr and Al in which M is at least one of the group of Ni, Co and Fe, the mixture having a total mixture composition of, by weight, 10–35% Cr, 4–19% Al, a small but effective amount of Y, 2–6% Si and the balance M, and further characterized by a substantial absence of B, the mixture being bound together with a binding amount of polytetrafluoroethylene, the first of the powdered alloys having a solidus and a liquidus, constituting from about 30 to about 50% by weight of the mixture, and comprising by weight 8–12% Si, 1.5–4% Al, 10–30% Cr and the balance M, the second of the powdered alloys having a solidus and a liquidus, constituting from about 50 to about 70% by weight of the mixture, and having a melting range higher than the first of the powdered alloys, the second alloy characterized by a substantial absence of Si, the first and/or second alloy characterized by the presence of Y in an amount, up to a total of about 1.0% by weight, which will provide the Y content in the total mixture composition;

(b) Compacting the polytetrafluoroethylene-bound mixture at compacting temperatures below the solidus of the first of the powdered alloys to provide a preform;

(c) Disposing the preform on a surface of the article;

(d) Heating the preform and article surface in a nonoxidizing atmosphere above the liquidus temperature of the first powdered alloy and below the liquidus of the second powdered alloy of the mixture; and (e) Holding the preform and article surface at the processing temperature for a time sufficient to liquid phase sinter the powder mixture, to interdiffuse elements of the first and second powders, to volatilize off HF from the polytetrafluoroethylene, and to bond the preform to the article surface.

In this and like embodiments the invention the method typically includes compacting the polytetrafluoroethylene-bound mixture between protective covers with repeated passes through a pair of rolls, and using a processing temperature between about 1200° F. and 2400° F. in step (e) of the method.

In another aspect of the invention there is provided a method of repairing an article including the steps of:

(a) Preparing at least a portion of the article to provide a repair receiving surface;

(b) Selecting from the powder mixture of first and second powdered alloys each having a base of elements M, Cr and Al in which M is at least one of the group of Ni, Co and Fe, the mixture having a total mixture composition of, by weight, 10–35% Cr, 4–19% Al, a small but effective amount of Y, 2–6% Si and the balance M, the first of the powdered alloys having a solidus and a liquidus, constituting from about 30 to about 50% by weight of the mixture, and comprising by weight 1.5–4% Al, 10–30% Cr and the balance M, the first alloy characterized by having silicon diffused thereinto in melting range lowering amount between about 5% and about 18% by weight, the second of the powdered alloys having a solidus and a liquidus, constituting from about 50 to about 70% by weight of the mixture, and having a melting range higher than the first of the powdered alloys, the second alloy characterized by a substantial absence of Si, the first and/or second alloy characterized by the presence of Y in an amount, up to a total of about 1.0% by weight, which will provide the Y content in the total mixture composition, as a replacement powder mixture which will provide a replacement article portion having a solidus above the incipient melting temperature of the article;

(c) Disposing the replacement powder mixture on the repair receiving surface;

(d) Heating the replacement mixture and repair receiving surface in a non-oxidizing atmosphere at a processing temperature above the liquidus temperature of the second powdered alloy and below the liquidus temperature of the first powdered alloy of the mixture; and (e) Holding the replacement mixture and repair receiving surface at the processing temperature for a time sufficient to liquid phase sinter the powder mixture, to interdiffuse elements of the first and second powders, and to bond the replacement mixture to the repair receiving surface.

In this and like embodiments, typically, the method also includes binding the mixture with a binding amount of polytetrafluoroethylene before disposing on the article surface.

In a further embodiment of the invention, there is provided a method of making an article having an inner portion of a superalloy selected from a group consisting of Co-base, Ni-base, or Fe-base superalloys and having an incipient melting temperature, and an environmentally resistant, abradable outer portion metallurgically bonded with the inner portion, the outer portion consolidated and liquid phase sintered from a powder mixture of two powdered alloys each comprising a base of elements M, Cr and Al in which M is at least one element selected from a group consisting of Co and Ni, the mixture having a total mixture composition consisting essentially of, by weight, 10–35% Cr, 4–10% Al, from a small but effective amount of Y, 2–6% Si with the balance M, the first of the powdered alloys comprising 30–50% by weight of the mixture, characterized by being diffused with silicon, and comprising, by weight, 8–12% Si, 1.5–4% Al, 10–30% Cr, with the balance M, the second of the powdered alloys constituting 50–70% by weight of the powdered mixture and characterized by the substantial absence of Si, by having a solidus and a liquidus, and by having a melting range higher than the first of the powdered alloys, the first and/or second powdered alloys characterized by the presence of Y in an amount, up to a total of about 1.0% by weight, which will provide the Y content in the total mixture composition, including the steps of (a) Compacting the powder mixture of the outer portion at a compacting temperature below the solidus of the second of the powdered alloys to provide a preform;

(b) Disposing the preform on a surface of the inner portion;

(c) Heating the preform and surface in a non-oxidizing atmosphere at a processing temperature above the liquidus temperature of the first powdered alloy and below the liquidus temperature of the second powdered alloy of the mixture; and (d) Holding the preform and the surface at the processing temperature for a time sufficient to liquid phase sinter the powder mixture, to interdiffuse elements of the first and second powders, and to bond the preform to the surface of the inner portion.

In this and like embodiments, typically, the method includes selecting a turbine shroud as the article, and the invention includes a turbine shroud made by this method and by the method which further includes binding the first and second powdered alloys with polytetrafluoroethylene in advance of the compacting step, and volatilizing HF from the polytetrafluoroethylene in the interdiffusion of elements step in oxide stripping relation.

The invention provides in another aspect a composition comprising a mixture of two powdered alloys each comprising a base of elements M, Cr and Al in which M is at least one element selected from the group consisting of Ni, Co and Fe, the mixture having a total mixture composition comprising by weight, 10–35% Cr, 4–10% Al, from a small but effective amount of Y, 2–6% Si, with the balance M, the Si being present solely as a diffused element into the lower temperature range melting one of the powdered alloys.

In this connection there is provided a more particular composition comprising a mixture of two powdered alloys each comprising a base of elements M, Cr and Al in which M is at least one element selected from the group consisting of Ni, Co and Fe, the mixture having a total mixture composition comprising by weight, 10–35% Cr, 4–10% Al, from a small but effective amount up to about 0.09% Y, 2–6% Si, with the balance M, the Si being present solely as a diffused element into the first of the powdered alloys, and further characterized by the substantial absence of B;

the first of the powdered alloys having a solidus and a liquidus, constituting 30–50% by weight of the mixture, being characterized by the substantial absence of Y, and comprising, by weight, 8–12% Si, 1.5–4% Al, 10–30% Cr, with the balance M, the second of the powdered alloys having a solidus and a liquidus, constituting 50–70% by weight of the mixture and having a melting range higher than the first of the powdered alloys;

the second alloy characterized by the substantial absence of Si, the second powdered alloy characterized by the presence of Y in an amount, up to a total of about 0.15% by weight, which will provide the Y content in the total mixture composition.

The invention further provides an article including an environmentally resistant, abradable surface portion comprising:

an inner portion of a superalloy selected from a group consisting of Co-base, Ni-base or Fe-base superalloys and having an incipient melting temperature; and an outer portion metallurgically bonded with the inner portion, and consolidated and liquid phase sintered from a mixture of two powdered alloys each comprising a base of elements M, Cr and Al in which M is at least one element selected from the group consisting of Ni, Co and Fe, the mixture having a total mixture composition comprising by weight, 10–35% Cr, 4–10% Al, from a small but effective amount of Y, 2–6% Si, with the balance M, the Si being present solely as a diffused element into the lower temperature range melting one of the powdered alloys, the outer portion having a thickness in the range of at least about 0.05".

The invention further provides an article including an environmentally resistant, abradable surface portion comprising:

an inner portion of a superalloy selected from a group consisting of Co-base, Ni-base and Fe-base superalloys and having an incipient melting temperature; and an outer portion metallurgically bonded with the inner portion, and consolidated and liquid phase sintered from the mixture having a total mixture composition comprising by weight, 10–35% Cr, 4–10% Al, from a small but effective amount of Y, 2–6% Si, with the balance M, the Si being present solely as a diffused element into the first of the powdered alloys, and further characterized by the substantial absence of B;

the first of the powdered alloys having a solidus and a liquidus, constituting 30–50% by weight of the mixture, being characterized by the substantial absence of Y, and comprising, by weight, 8–12% Si, 1.5–4% Al, 10–30% Cr, with the balance M, the second of the powdered alloys having a solidus and a liquidus, constituting 50–70% by weight of the mixture and having a melting range higher than the first of the powdered alloys;

the second alloy characterized by the substantial absence of Si, the first and/or second powdered alloys characterized by the presence of Y in an amount, up to a total of about 1% by weight, which will provide the Y content in the total mixture composition, the outer portion having a thickness in the range of at least about 0.05".

The invention further provides a turbine shroud as the article, and a turbine shroud in which the outer portion is consolidated and liquid phase sintered from the mixture additionally comprising polytetrafluoroethylene in HF generating amount sufficient to strip oxides from the powdered alloy at temperatures in the melting range of the second powdered alloy.

The invention provides in a further aspect a method of coating a metal part including applying to the part surface a composition comprising a resinous binder processing aid and a mixture of a first lower melting MCrAl $(Y)_n$ powdered alloy and a second higher temperature melting MCrAl $(Y)_n$, powdered alloy, n being an integer of zero or greater, such as 1, and heating the composition and part to volatilize the binder and melt the powdered alloys in metallurgical bond forming relation with the metal part.

In this and like embodiments, the method typically further includes selecting as the resinous binder a resinous binder comprising a fluorine-containing synthetic organic polymer adapted to bind the powdered alloy composition, selecting as the fluorine-containing polymer binder polytetrafluoroethylene, volatilizing HF from the polytetrafluoroethylene binder during heating of the composition, and where the metal part is surface oxide-forming, e.g. oxides of aluminum, titanium or yttrium stripping the oxides from the powdered alloys with the HF in metallurgical bonding facilitating relation between the alloys and the part surface, adding silicon to the first powdered alloy before mixing with the second powdered alloy, diffusing silicon into the first powdered alloy in a diffusion pack at elevated temperatures, adding silicon at between about 5% and about 18% by weight to the first powdered alloy in the diffusion pack, adding silicon at about 9% by weight to the first powdered alloy in the diffusion pack, and selecting an MCrAl $(Y)_n$ powdered alloy, n being an integer of zero or greater, such as 1, in which M is Ni, Co and/or Fe as the first powdered alloy.

In a further aspect, the invention provides a method of uniformly distributing silicon through a composition of powdered MCrAl alloy, including surface diffusing silicon into a portion of the powdered alloy, and blending the silicon-diffused portion with the balance of the alloy.

In its compositional aspects the invention provides a metal part coating composition comprising an alloy powder-binding amount of a resinous binder and mixture of a first lower melting MCrAl $(Y)_n$ powdered alloy and a second higher temperature melting MCrAl $(Y)_n$ powdered alloy, n being an integer of zero or greater, the binder being volatile at the melting temperature of the alloys.

In this and like embodiments, typically, the first powdered alloy further comprises silicon in an amount lowering the melting temperature range of the powdered alloy, the silicon is surface-diffused into the first powdered alloy, the first powdered alloy further comprises from about 5% to about 18% by weight of the surface-diffused silicon, the resinous binder comprises a fluorine-containing synthetic organic polymer adapted to bind the alloy composition, the binder comprises polytetrafluoroethylene, the polytetrafluoroethylene binder comprises Teflon 6C, and, the polymer volatilizes HF at the melting temperatures of the higher melting of the powdered alloys.

In another aspect the invention provides a metal coating composition comprising an intimately interdistributed mixture of a first lower melting MCrAl $(Y)_n$ powdered alloy, a second higher temperature melting MCrAl $(Y)_n$ powdered alloy, n being an integer of zero or greater, and an alloy powder-binding amount of a resinous binder, the binder being volatile at the melting temperature of the higher temperature melting of the alloys.

In this and like embodiments of the invention, typically, the first powdered alloy further comprises silicon diffused thereinto in fusion temperature lowering amount.

In yet another aspect of the invention there is provided a preformed metal coating product comprising compressed into a predetermined form adapted to coat a metal surface an intimately interdistributed mixture of a first lower melting MCrAl $(Y)_n$ powdered alloy, a second higher temperature melting MCrAl $(Y)_n$ powdered alloy, n being an integer of zero or greater, and an alloy powder-binding amount of a resinous binder, the binder being volatile at the melting temperature of the higher temperature melting of the alloys.

In this and like embodiments, the product is formed of multiple, separable layers of generally uniform composition with each other, the product comprises from about 15% to about 55% by weight of the first powdered alloy, the balance the second powdered alloy and sufficient binder to maintain the product in its the predetermined form, the product is self-supporting and flexible in its the predetermined form, the product has a laminar structure permitting successive separation of layers of the product from the balance of the product, the layers having the composition of the balance of the product and greater flexibility than the product before separation of successive layers, the product is sufficiently flexible at a one-eighth inch thickness to bend 90° without breaking at the fold locus, the first powdered alloy further comprises silicon in an amount effecting the first powdered alloy lower melting temperature, the first alloy powder silicon content is diffused thereinto, the first alloy powder contains from about 5% to about 18% by weight diffused silicon, the resinous binder comprises a fluorine-containing synthetic organic polymer adapted to bind the alloy mixture in its the predetermined form, the binder comprises polytetrafluoroethylene polymer, the polytetrafluoroethylene comprises Teflon 6 and is present in an amount between about 0.1% and about 1.0% by weight of the product, and the polymer volatilizes HF at the melting temperature of the higher melting of the powdered alloys.

In yet another embodiment, the invention provides a laminate comprising:
- an inner portion of a superalloy selected from a group consisting of Co-base, Ni-base and Fe-base superalloys; and
- an outer portion comprising a consolidated and liquid phase sinterable mixture of two powdered alloys each comprising a base of elements M, Cr and Al in which M is at least one element selected from the group consisting of Ni, Co and Fe, the mixture having a total mixture composition comprising by weight, 10–35% Cr, 4–10% Al, from a small but effective amount up to about 0.09% to 1%Y, 2–6% Si, with the balance M, the Si being an alloy constituent or a diffused element and present solely in the lower temperature range melting one of the powdered alloys, the outer portion mixture having a thickness in the range of at least about 0.05 inch; or the laminate comprising:
- an inner portion of a superalloy selected from a group consisting of Co-base, Ni-base and Fe-base superalloys; and
- an outer portion comprising a consolidated and liquid phase sinterable mixture of a polytetrafluoroethylene binder and two powdered alloys each comprising a base of elements M, Cr and Al in which M is at least one element selected from the group consisting of Ni, Co and Fe, the mixture having a total mixture composition comprising by weight, 10–35% Cr, 4–10% Al, from a small but effective amount up to about 0.09% to 1%Y, 2–6% Si, with the balance M, the outer portion mixture having a thickness in the range of at least about 0.05 inch.

In a further aspect the invention provides the above article substantially free of oxides such as aluminum oxides in the metallurgical bond by HF removal of the oxides during liquid phase sintering.

The invention further provides an article comprising:
- an inner portion of a superalloy selected from a group consisting of Co-base, Ni-base and Fe-base superalloys; and
- an outer portion metallurgically bonded with the inner portion, and consolidated and liquid phase sintered from a mixture of two powdered alloys each comprising a base of elements M, Cr and Al in which M is at least one element selected from the group consisting of Ni, Co and Fe, one of the powdered alloys containing Si as a diffused element, e.g. in the form of a turbine shroud, or in the form of a turbine blade or vane.

BRIEF DESCRIPTION OF THE DRAWINGS

The invention will be further described in conjunction with the attached drawings in which.

DESCRIPTION OF THE PREFERRED EMBODIMENTS

Figure 1:
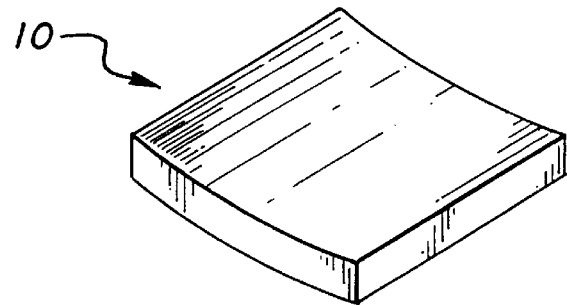
FIG. 1 is an axonometric view of a turbine engine shroud.

The invention improved compositions, articles and products, including, importantly, turbine engine shroud coatings, are realized through the diffusion addition of silicon to MCrAl(Y)$_n$ (where n is an integer of 0, 1 or greater) powdered alloys rather than use such alloys already containing silicon; thereby have a broader choice of alloy composition. In U.S. Pat. No. 3,073,269 to Hoppin et al and U.S. Pat. No. 3,155,491 to Hoppin et al brazing alloys are disclosed comprising a first and second powdered nickel, cobalt and iron-based powdered alloy compositions containing small amounts of silicon, chromium and boron in melting point lowering amount., e.g. 1.5 –2.4% by weight silicon. In the Perkins patents more specific forms of these powdered alloy brazing compositions were taught to be useful in making brazing compositions for abradable coatings on turbine engine shrouds and other articles. The Perkins patents continued the reliance of the Hoppin patents on the presence in the powdered alloys of silicon as an alloy constituent. This requirement limits the alloys that are useful in the brazing compositions to those that contain the requisite amount of silicon and the needed presence of silicon may limit the other constituents in the powdered alloys.

The present invention avoids the compositional limits of previous nickel, cobalt or iron brazing alloy powder compositions by taking an alloy of the desired composition but not containing silicon as a constituent of the alloys and adding by the familiar diffusion alloying process a controlled amount of silicon by diffusing the silicon into the surface of the powdered alloy in a cementitious diffusion pack comprising powdered silicon and alloy dispersed in a refractory powder with a suitable carrier such as ammonium bifluoride for an extended number of hours at elevated temperatures at which the silicon will diffuse into the powdered alloy surface.

Nickel, cobalt, or iron-based alloys useful in the invention are those generally referred to a MCrAl(Y)$_n$ alloys (n being 0 or an integer of 1 or more) in which M is Ni, Co or Fe, chromium is present in amounts of from about 10 to about 30 weight %, Al is present in amounts of from about 4 to about 19 weight %, and Y if present is present in amounts of 0.01 to 1.0 weight %, the powdered alloys being blended so as to have from 0.03 to 0.06 weight % Y in the brazing composition blend of the alloys.

The invention affords improved bonding of alloy compositions to an article substrate through the stripping of oxides, particularly aluminum, titanium or yttrium oxides, from the bonding interface during brazing and melting of the composition onto the substrate. HF generated in situ during the heating of the composition to melt condition strips the oxides. The presence of oxides on the part surface before coating, such as may occur even in vacuum chambers with aluminum and titanium containing parts, unless the part surface is protected with plating, for example, precludes obtaining a good bond between coating and part surface. The use of HF stripping removes these oxides in the course of bonding the coating onto the part and makes the use of plating to protect the surface unnecessary. Parts bonded with coatings in accordance with the invention using HF strippers in the bonding step have a metallurgical bond substantially free of oxides. Advantageously the HF source is a fluorine substituted polymer which functions as a processing aid in preparation of the braze composition. Suitable HF precursors include the polytetrafluoroethylene polymers sold under the trade mark Teflon®. Any polytetrafluoroethylene polymer will be useful as an HF precursor; as a processing aid, however, certain of these polymers are favored, including Teflon 6 or 6C which has been found to lend lubricity to the powdered alloy blends of the invention enabling easier processing into the blended state, improve wetting properties of the blends in sintering. The improved wetting properties are such that the presence of the above-noted amounts of yttrium do not detract from effective wetting of the alloy powders or impede sintering. The binder reins bind the powdered alloy blends into a formable condition, without the pre-sintering step needed in the prior art processes, and without obtaining only a brittle biscuit with no flexibility to adapt to curved or otherwise irregular surfaces and areas of articles. The chemistry of suitable polytetrafluoroethylene polymers for binding powders, but not for HF generation which is disclosed only in this application, is described in U.S. Pat. No. 4,194,040 to Breton et al, the disclosure of which is incorporated herein by this reference.

The powdered alloys useful herein are generally those disclosed in the above mentioned Perkins patents, particularly for turbine engine shroud abradable coating application, with the caveat that the yttrium limitations, the boron limitations and the silicon limitations therein disclosed are not critical in the present invention methods, products and articles. Rather these limitations are inapplicable and the powdered alloy compositions useful in the present invention are limited only as set forth above. It has been noted, in particular, that the presence of increased amounts of yttrium in the powdered alloys, to between 0.1 and 1.0 weight %, will not unduly affect wetting of the powdered alloy blends; the presence of the processing aid more than overcomes the non-wetting propensity of the yttrium containing powdered alloys, enabling a broader choice of alloys, in terms of yttrium content, than those found suitable in the mentioned Perkins patents.

The wide range of powdered alloys useful in the present invention is further enhanced by the addition of silicon by a post-alloy formation step, rather than requiring its presence in the powdered alloy from the outset. While various silicon-containing powdered alloys are known, and some are identified in the noted Perkins patents, these alloys are less common and less numerous than nonsilicon-containing alloys. And the quantity of silicon in available silicon containing powdered alloys is not always optimum for the purpose at hand. A major advantage of the present invention is the addition of silicon in desired amounts to a powdered alloy of otherwise desirable composition without constraints being imposed by having the silicon content a part of the original powdered alloy. The addition of silicon is by the diffusion alloying process in which the powdered alloy is blended with silicon powder, placed in a retort from which oxygen is excluded and heated in the presence of a carrier such as a halide, e.g a fluoride, such as ammonium bifluoride in effective amount generally less than 1% by weight of the blended metals, at elevated temperatures, generally in excess of 1500° F., for a sufficient time, e.g. from 12 to 24 hours or until the silicon has been transferred into the surface of the powdered alloy particles with the formation of difftsion alloys of silicon and the components of the alloy. The amount of silicon that can be thus introduced into the powdered alloys is not narrowly limited and may be in enhancement of silicon already present in the powdered alloy. As mentioned above silicon content in the powdered alloys can range from about 5% to about 18% by weight. Preferred limits are from about 5% to about 6% by weight silicon in the final composition, with amounts in the contributing powdered alloys adjusted to bring the blended composition to this content of silicon.

EXAMPLES

All parts and percentages are by weight.

Example 1

1. Preparation of the Silicon Diffused Powdered Alloy. Raw silicon 100 parts and CO-159 MCrAlY alloy containing Ni, 32%, Cr, 21%, Al, 8% Co 37.9%, Y, 0.5% and other elements 0.6%, 800 parts, were blended together for eight hours, and heated in a closed retort under an inert atmosphere at 1650° F. for 10 hours in the presence of ammonium bifluoride carrier. The resultant powdered alloy cake of silicon diffused CO-159 alloy was crushed to approximately one-half inch diameter particles which were sifted to remove particles under 140 U.S. mesh.

2. Preparation of the Powdered Alloy Blend. The silicon-diffused powder particles from Step 1, 500 parts, were blended with additional CO-159 powder, 1000 parts, for eight hours. A binder resin comprising polytetrafluoroethylene, 55 parts, was added to the 1500 parts of blended powdered alloy as a source of HF in the final step. The mixture was rolled in a mill for 30 minutes with the rolled material repeatedly cut and cross-rolled. The mixture had a thickness of approximately one-quarter inch, was self-supporting, and able to be handled easily.

3. Preparation of the Biscuit. Sections of the rolled mixture prepared in Step 2 were taken off the rolls, compressed in a 100 ton press to a predetermined thickness for the desired biscuit of one-eighth inch. The pressed biscuit product was flexible along its longitudinal and transverse axes, and able to be folded on itself without cracking at the locus of the fold. Certain of the biscuits were peeled layer by layer into constituent layers, each of which was self-supporting and had the composition of the balance of the sections, and greater flexibility than the overall biscuit. The biscuit was ready for coating application without a pre-sintering step such as used in the Perkins patents to give body to the biscuit.

4. Coating of the Turbine Engine Shroud. The biscuit obtained in Step 3 was hand-formed to match the surface contour of a turbine engine shroud by gently pressing the biscuit into contact with the slightly dished surface of the shroud which had been deburred and grit blasted. A lacquer adhesive was used to maintain the biscuit in place, although use of this adhesive, or any adhesive, is not always necessary. The biscuit dimensions slightly exceeded the dimensions of the shroud sufficiently to allow for shrinkage of the biscuit mixture during subsequent processing and final registration of the coating with the shroud. The laminate was placed in an oven, heated at 1220° F. for 90 minutes, at 1800° F. for 30 minutes, at 1875° F. for 30 minutes, and at 2315° F. for 90 minutes, vacuum cooled to below 1550° F. and then cooled to room temperature. All times are held within plus or minus 5 minutes and all temperatures within plus or minus 25° except for the final heating which was held at plus or minus 15°. HF gas is emitted from the oven, emanating from the biscuit as a function of vaporization of the polytetrafluoroethylene processing aid and HF precursor, and is captured.

Microphotographic examination of the coating/shroud interface reveals a substantial absence of aluminum oxides which are inimical to a good metallurgical bond, a far less presence than when effecting coatings using a powdered alloy mixture without HF stripping from the presence of the polytetrafluoroethylene processing aid.

The analysis of the shroud coating is Ni, 31.35%, Cr, 20.29%, Al, 7.65%, Co, 36.24%, Y, 0.48%, other 0.59%, Si, 3.41%, and B 0.0003%, which is a highly desirable composition for a shroud abradable coating.

Example 2

A part formed of the aluminum 4%, titanium 4% alloy Inco 738 was coated in the manner of Example 1. This alloy is expected to form aluminum and/or titanium oxides on its surface under the Example 1 processing conditions. Nonetheless, there was no aluminum or titanium oxide detected at the coating/part interface following the fusion of the coating biscuit onto the part surface.

CONTROL A

Example 2 is duplicated using a biscuit like that in Example 1, but omitting the polytetrafluoroethylene binder. The biscuit powdered alloys are blended and lightly sintered to define the biscuit instead of using the binder resin. After processing to fusion of the biscuit as a coating on the part, there is no bonding of the coating to the part. Inspection of the part surface reveals a layer of mixed aluminum and titanium oxides which precluded bonding of the coating to the part surface. These oxides were not removed during the fusion step because of the absence of HF.

Example 3

The steps of Example 1 are repeated except that the first powdered alloy is an alloy of the composition: Co, 18%, Cr, 18.2%, Al, 2.7%, Y, 0%, Si, 8% and the balance Ni; and the second powdered alloy has the composition: Ni, 16.8%, Cr, 24.9%, Al, 9.9%, Si, 0% and the balance Co. Silicon being present as a part of the first alloy, the addition of silicon by diffusion is omitted. A metallurgically bonded coating is achieved on the shroud.

Figure 2:
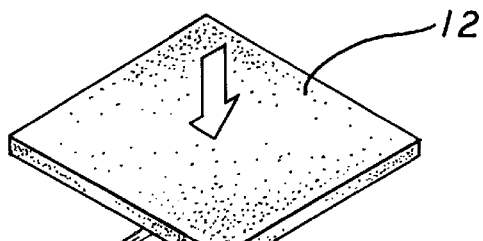
FIG. 2 is a view like FIG. 1, with a generally planar preform according to the invention positioned above.
Figure 3:
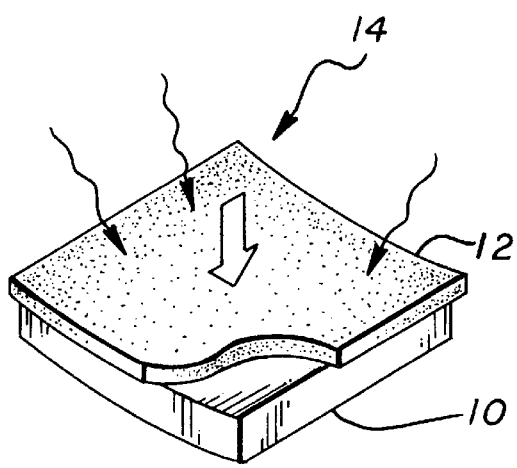
FIG. 3 is a view like FIG. 2 with the preform conformed from planar to the shape of the shroud surface and attached to the shroud for the powdered alloy mixture sintering, melting or fusing, and bonding step.
Figure 4:
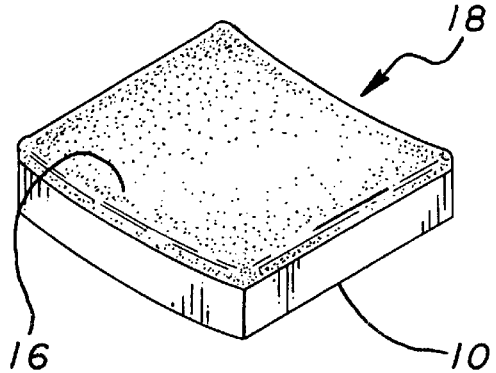
FIG. 4 is a view of the product of the sintering, melting or fusing, and bonding step shown in FIG. 3, the product having contracted to the general dimensions of the shroud; and, FIG. 5 is a view of a turbine engine blade with replacement coating material added thereto at the tip as a laminate layer cut to fit the blade tip, and at the leading edge as a laminate layer folded into conformance with the edge contour.

With reference now to the drawings in detail, in FIG. 1 a turbine engine shroud 10 is depicted with certain of the machining details omitted. In FIG. 2 the biscuit 12 is positioned above the shroud 10. A laminate 14 of the shroud 10 and biscuit 12, the biscuit being slightly oversize, is shown in FIG. 3. In FIG. 4 the sintered biscuit 16 is metallurgically bonded to the shroud 10 forming a coated article 18.

Figure 5:
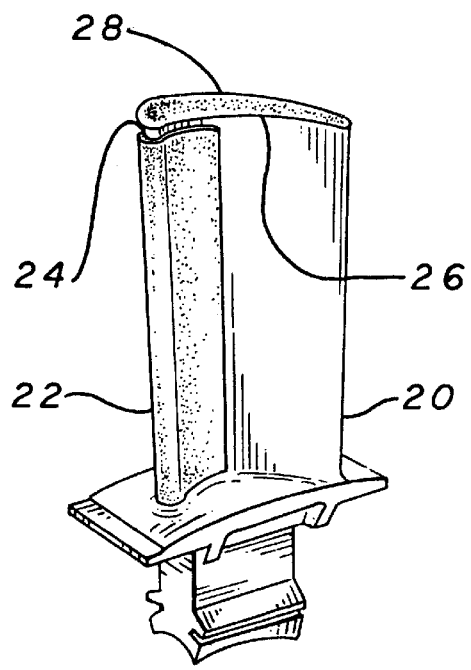

In FIG. 5, the capability of the invention biscuit to wrap to even dramatic contours of a part is illustrated. Turbine engine blade 20 is provided with a leading edge-coating, unsintered biscuit 22 which as will be noted is simply folded around the blade leading edge 24, where it is to be sintered and bonded in place to add an integral coating to the blade leading edge. Other portions of the blade 20 can also be repaired or coated as illustrated by the fitting into the tip 26 of the blade of a custom-cut biscuit section 28, wherein it is to be sintered and bonded as in the foregoing Example.

The invention thus provides an improved method of coating turbine engine shrouds, using biscuits which are flexible to be conformed to virtually any shape of substrate surface, a method of making biscuits for such coating methods which is not limited in which alloys it can use by constraints on the presence and quantities of silicon and/or yttrium, and novel biscuits by such method. Further the invention provides biscuit compositions which are self-stripping of oxides, and coatings made therefrom which are stripped of oxides in the course of coating formation as a result of the biscuit composition. The invention further provides a repair composition, suitably but not necessarily in the form of a biscuit, for repair of metal parts, including gas turbine components such as shrouds, blade surfaces and blade tips, and components of all types, where an abradable surface coating is desirable. The invention also provides improvements in the processing of superalloy powders into coating products such as biscuits, coating preparation methods which enable the use of a wide number of superalloys, to which silicon is added in the desired amount for sintering, and fabrication methods which simplify biscuit formation, provide flexible biscuits, and as well generate oxide-stripping HF in the coating composition during coating formation.

The foregoing objects of the invention are thus met.

We claim:

1. A flexible and self-supporting preformed metal coating product comprising compressed into a predetermined form adapted to coat a metal surface an intimately interdistributed mixture of a first lower melting MCrAl(Y)$_n$ powdered alloy, a second higher temperature melting MCrAl(Y)$_n$ powdered alloy, n being an integer of zero or greater, and an alloy powder-binding amount of a resinous binder, said binder comprising a fluorine-containing synthetic organic polymer adapted to bind said alloy mixture in its said predetermined form, said binder volatilizing HF at the melting temperature of the higher temperature melting of said alloys.

2. The preformed metal coating product according to claim 1, in which said product is formed of multiple, separable layers of generally uniform composition with each other.

3. The preformed metal coating product according to claim 1, in which said product comprises from about 15% to about 55% by weight of said first powdered alloy, the balance said second powdered alloy and sufficient binder to maintain said product in its said predetermined form.

4. The preformed metal coating product according to claim 1, in which said product has a laminar structure permitting successive separation of layers of said product from the balance of said product, said layers having the composition of the balance of the product and greater flexibility than said product before separation of successive layers.

5. The preformed metal coating product according to claim 1, in which said product is sufficiently flexible at a one-eighth inch thickness to bend 90° without breaking at the fold locus.

6. The preformed metal coating product according to claim 1, in which said first powdered alloy further comprises silicon in an amount effecting said first powdered alloy lower melting temperature.

7. The preformed metal coating product according to claim 6, in which said first alloy powder silicon content is diffused thereinto.

8. The preformed metal coating product according to claim 7, in which said first alloy powder contains from about 5% to about 18% by weight diffused silicon.

9. The preformed metal coating product according to claim 1, in which said binder comprises polytetrafluoroethylene polymer.

10. The preformed metal coating product according to claim 9, in which said polytetrafluoroethylene comprises Teflon 6 and is present in an amount between about 0.1% and about 1.0% by weight of the product.

11. A flexible and self-supporting preformed metal coating product comprising compressed into a predetermined form adapted to coat a metal surface an intimately interdistributed mixture of a first lower melting MCrAl (Y)$_n$ powdered alloy, a second higher temperature melting MCrAl (Y)$_n$ powdered alloy, n being an integer of zero or greater, and an alloy powder-binding amount of a resinous binder, said binder comprising Teflon 6 polytetrafluoroethylene synthetic organic polymer adapted to bind said alloy mixture in its said predetermined form, said binder volatilizing HF at the melting temperature of the higher temperature melting of said alloys.

12. The preformed metal coating product according to claim 11, in which said product is formed of multiple, separable layers of generally uniform composition with each other.

13. The preformed metal coating product according to claim 12, in which said product comprises from about 15% to about 55% by weight of said first powdered alloy, and the balance said second powdered alloy and sufficient polytetrafluoroethylene binder to maintain said product in its said predetermined form.

14. The preformed metal coating product according to claim 13, in which said product has a laminar structure permitting successive separation of layers of said product from the balance of said product, said layers having the composition of the balance of the product and greater flexibility than said product before separation of successive layers.

15. The preformed metal coating product according to claim 14, in which said product is sufficiently flexible at a one-eighth inch thickness to bend 90° without breaking at the fold locus.

16. The preformed metal coating product according to claim 15, in which said first powdered alloy further comprises silicon in an amount effecting said first powdered alloy lower melting temperature.

17. The preformed metal coating product according to claim 16, in which said first alloy powder silicon content is diffused thereinto.

18. The preformed metal coating product according to claim 17, in which said first alloy powder contains from about 5% to about 18% by weight diffused silicon.

19. The preformed metal coating product according to claim 18, in which said polytetrafluoroethylene Teflon 6 is present in an amount between about 0.1% and about 10% by weight of the product.

20. The preformed metal coating product according to claim 11, in which said polytetrafluoroethylene Teflon 6 is present in an amount between about 0.1% and about 1.0% by weight of the product.

* * * * *